March 22, 1966  E. A. JOHNSON  3,241,494
FUEL SYSTEMS

Filed Jan. 15, 1960  8 Sheets-Sheet 1

INVENTOR.
ELDON A. JOHNSON
BY
AGENT

March 22, 1966  E. A. JOHNSON  3,241,494
FUEL SYSTEMS

Filed Jan. 15, 1960  8 Sheets-Sheet 2

INVENTOR.
ELDON A. JOHNSON
BY
AGENT

March 22, 1966     E. A. JOHNSON     3,241,494
FUEL SYSTEMS
Filed Jan. 15, 1960
8 Sheets-Sheet 3
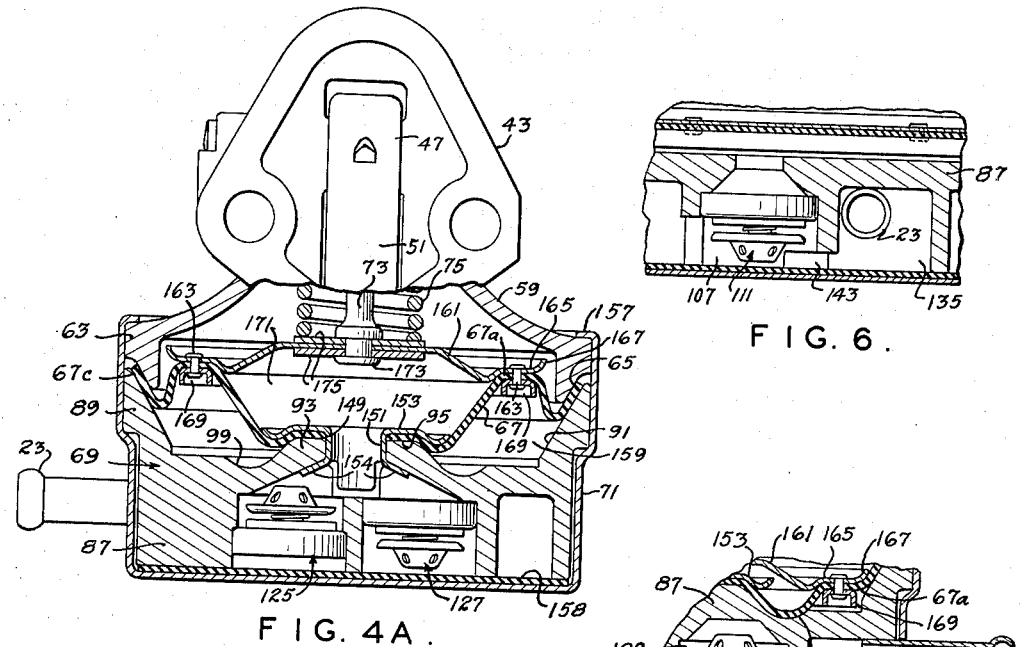
FIG. 4A.
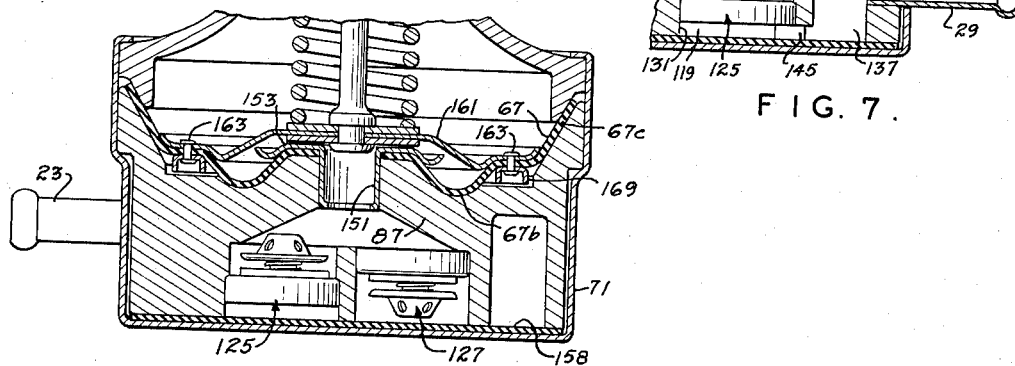
FIG. 4B.
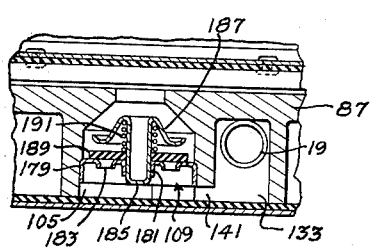
FIG. 5.
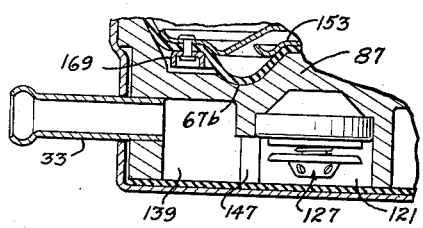
FIG. 6.
FIG. 7.
FIG. 8.
INVENTOR.
ELDON A. JOHNSON
BY
AGENT March 22, 1966  E. A. JOHNSON  3,241,494
FUEL SYSTEMS Filed Jan. 15, 1960  8 Sheets-Sheet 4

INVENTOR.
ELDON A. JOHNSON
BY
AGENT

INVENTOR.
ELDON A. JOHNSON
BY
AGENT

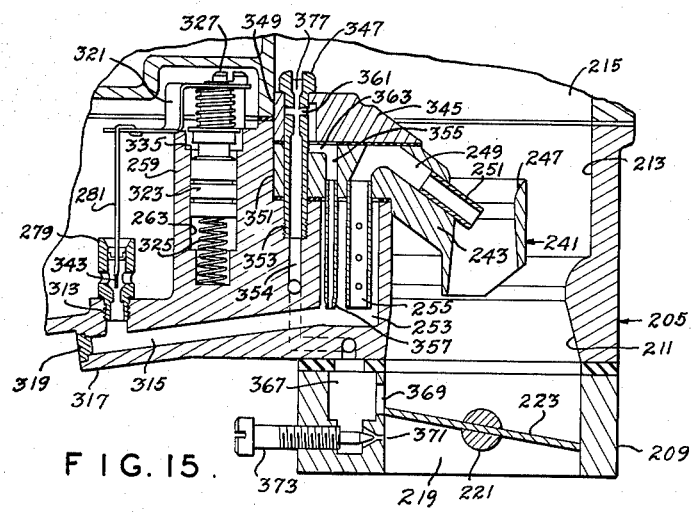

March 22, 1966  E. A. JOHNSON  3,241,494
FUEL SYSTEMS

Filed Jan. 15, 1960  8 Sheets-Sheet 8

*INVENTOR.*
ELDON A. JOHNSON
BY

AGENT

United States Patent Office

3,241,494
Patented Mar. 22, 1966

3,241,494
FUEL SYSTEMS
Eldon A. Johnson, Sunset Hills, Mo., assignor to ACF Industries, Incorporated, New York, N.Y., a corporation of New Jersey
Filed Jan. 15, 1960, Ser. No. 2,660
14 Claims. (Cl. 103—150)

This invention relates to fuel systems for internal combustion engines, more particularly to fuel systems for automotive engines, and to fuel pumps and carburetors used in such systems.

The invention is especially concerned with a fuel system of a type wherein fuel is supplied from the fuel tank of the automotive vehicle to a carburetor having a fuel bowl from which fuel overflows above a predetermined level, overflow fuel being returned to the tank, there being a constant circulation of fuel from the tank to the carburetor and back to the tank when the engine is in operation. This type of fuel system may be referred to as a "recirculating" system, since fuel is constantly being recirculated through the system when the engine is in operation. In such a system, fuel needs to be pumped from the tank to the fuel bowl at a rate in excess of the engine fuel demand in order to maintain the predetermined level or head of fuel in the bowl for accurate metering of fuel from the bowl to the engine, and overflow fuel needs to be pumped back to the tank. The pumping of overflow fuel back to the tank is referred to as "scavenging."

Basically, the object of the invention is the provision of a practical, economical recirculating system adapted reliably to supply the engine fuel demand which, as will be readily understood, varies widely with variations in the load on the engine, the system being such as to avoid vapor lock difficulties and flooding. To accomplish this basic object, the invention includes a novel overflow carburetor and a novel pump, the latter being a dual diaphragm pump by means of which the pumping of fuel to the fuel bowl of the carburetor and the scavenging of fuel from the carburetor is accomplished by means of a single diaphragm which may be actuated by the engine at a speed varying with the speed of the engine, and with a displacement varying with engine fuel demand so as to pump fuel to the fuel bowl at a rate which is somewhat in excess of the engine fuel demand at any instant, thereby to maintain the substantially constant head of fuel in the fuel bowl and to maintain the recirculation of fuel.

Essentially, the pump comprises two pumping chambers with a single diaphragm common to the two chambers and separating one chamber from the other. One chamber constitutes a primary pump chamber and has an inlet connected to the tank and an outlet connected to the fuel bowl of the carburetor. The other chamber constitutes a scavenger pump chamber and has an inlet connected to receive the overflow from the carburetor and an outlet connected to the tank. Means is provided for actuating the diaphragm from the engine and the diaphragm acts on flexure thereof to expand and contract the chambers thereby to effect delivery of fuel to the fuel bowl and scavenging of overflow fuel from the carburetor.

Among the objects of the invention as regards the pump may be noted the provision of a pump construction which is such as to enable the diaphragm to be spring-loaded for flexure in one direction through a primary discharge stroke and to be flexed in the opposite direction through a primary intake stroke by an engine-driven rod, without any necessity for inclusion of packing to make a fuel-tight seal on the rod. In this respect, it will be understood that packing frequently fails under attack of fuel, and the pump construction of this invention, by eliminating any necessity for the use of packing, eliminates this cause of pump failure.

Among the objects of the invention as regards the carburetor may be noted the provision of an overflow carburetor construction which tends to avoid vapor lock and which is such as to minimize the effect of sudden acceleration and deceleration of the vehicle and cornering of the vehicle on the level of fuel in the fuel bowl of the carburetor, and which is adapted accurately to meter fuel to the engine in accordance with all the various engine fuel demands that may occur, as during idling of the engine, during light load and heavy load operation, and during acceleration; and the provision of an overflow carburetor construction which is compact for its capacity and which may be of relatively low height.

Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a view in elevation illustrating a recirculating fuel system of this invention including a pump and a carburetor of this invention mounted on the engine of an automotive vehicle;

FIG. 4A is a view similar to FIG. 4 showing a moved position of pump parts;

FIG. 4B is a view similar to FIG. 4 showing a modification in the pump construction;

Figure 2:
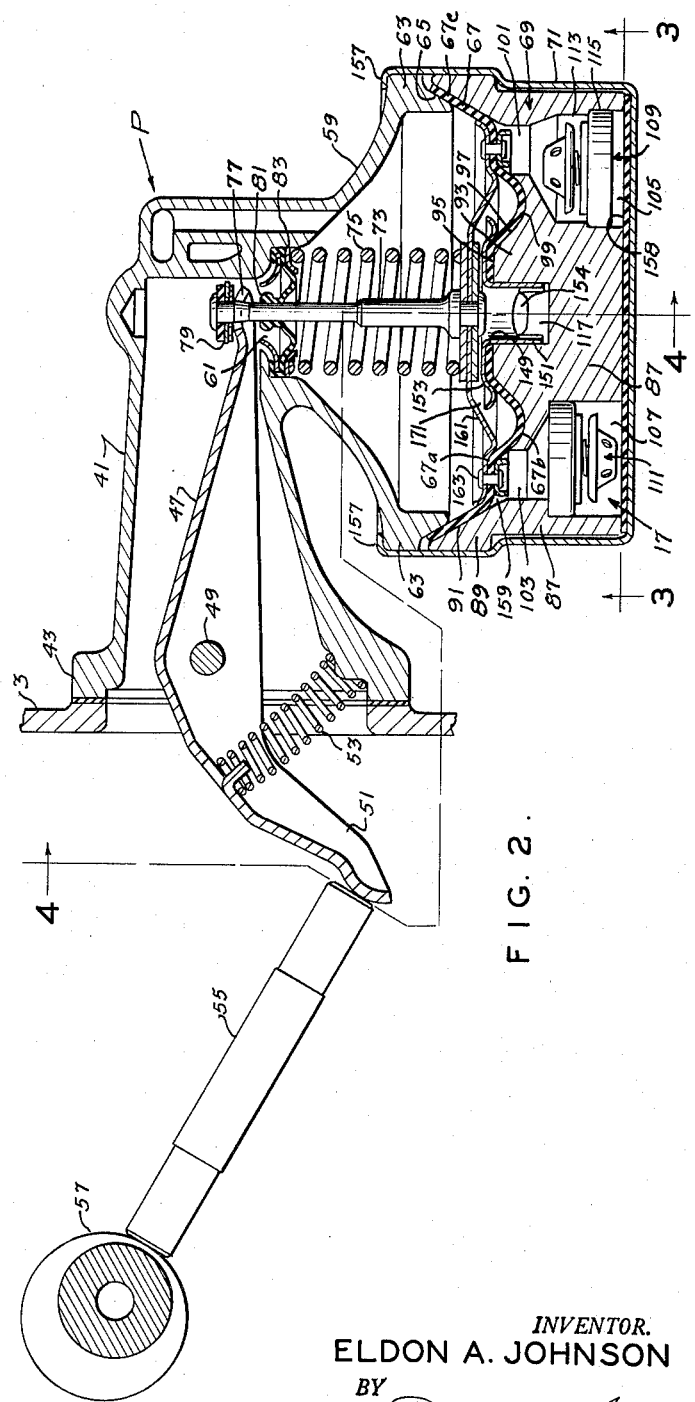
FIG. 2 is a longitudinal section of the pump per se.
Figure 3:
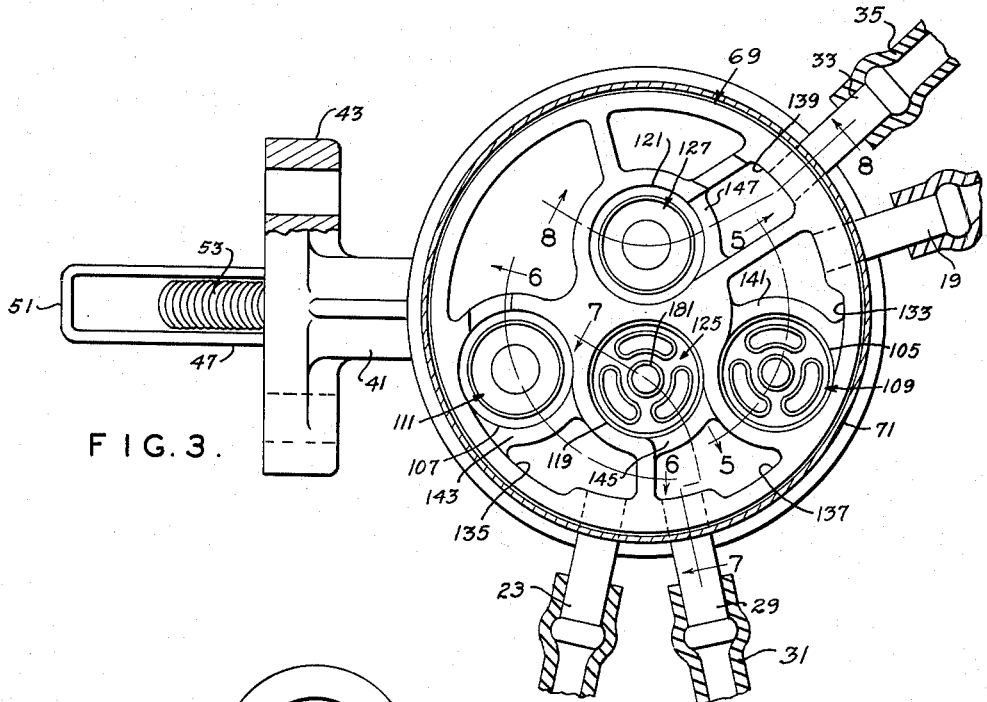
FIG. 3 is a section of the pump taken on line 3—3 of FIG. 2.
Figure 9:
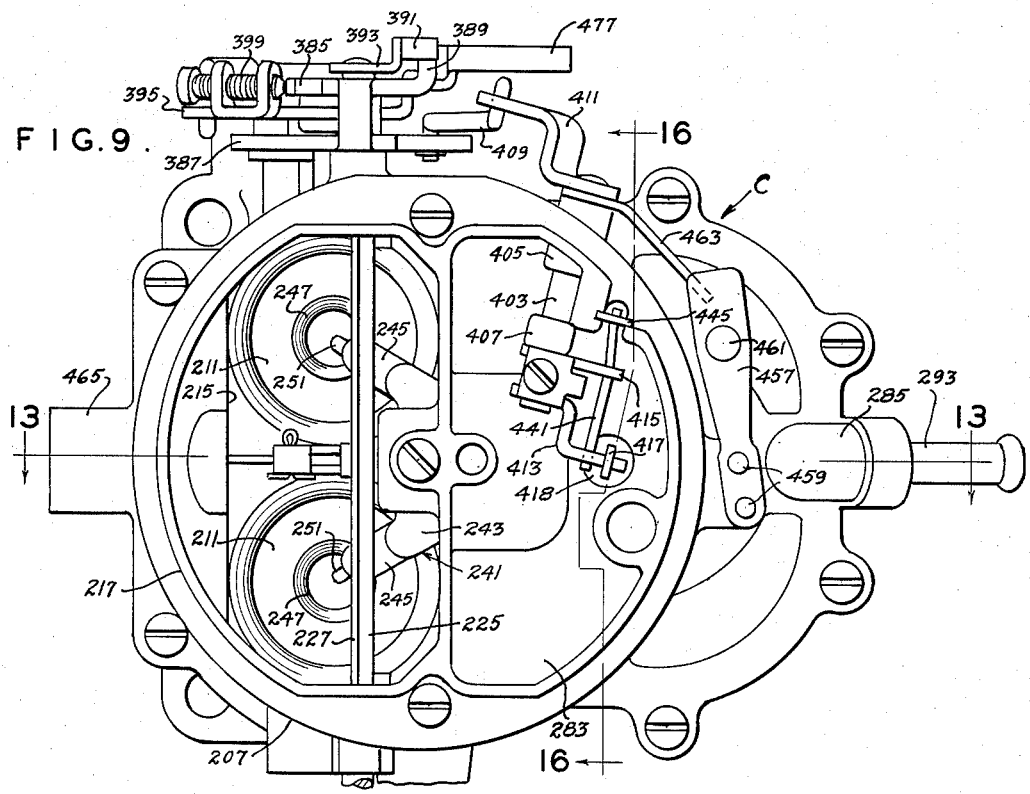
Figure 10:
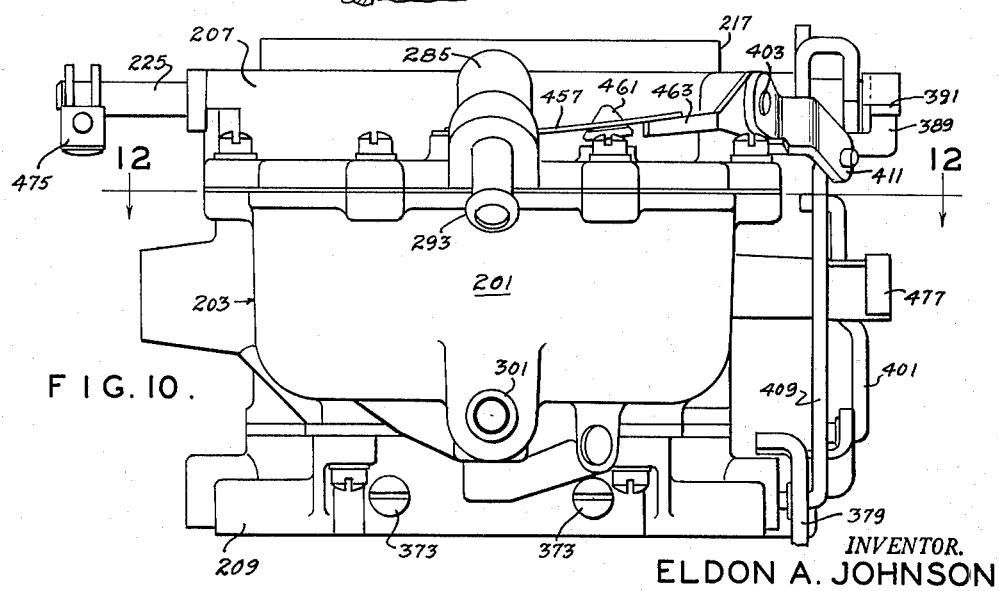
Figure 11:
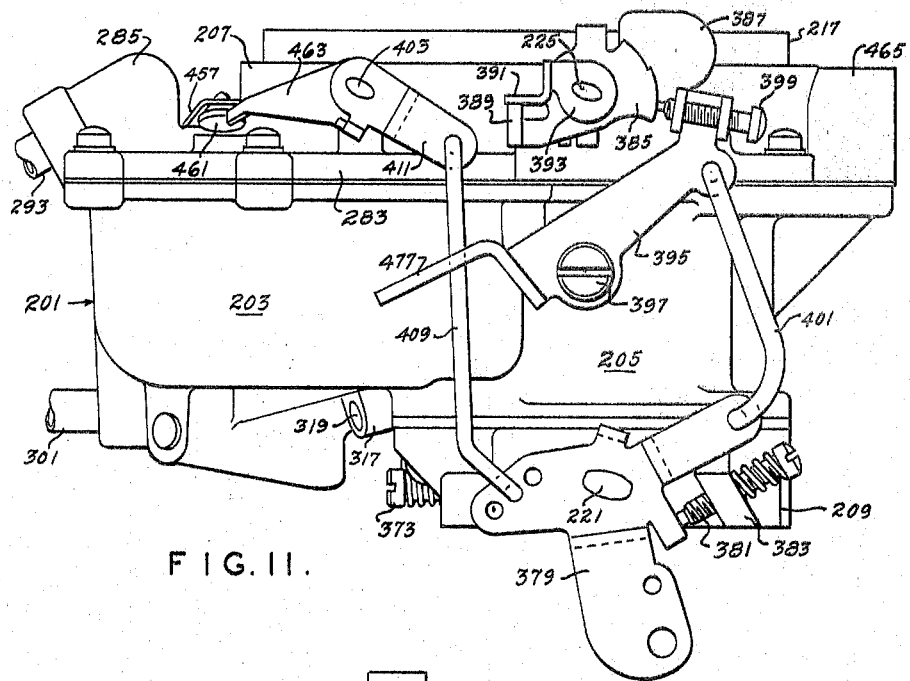
Figure 12:
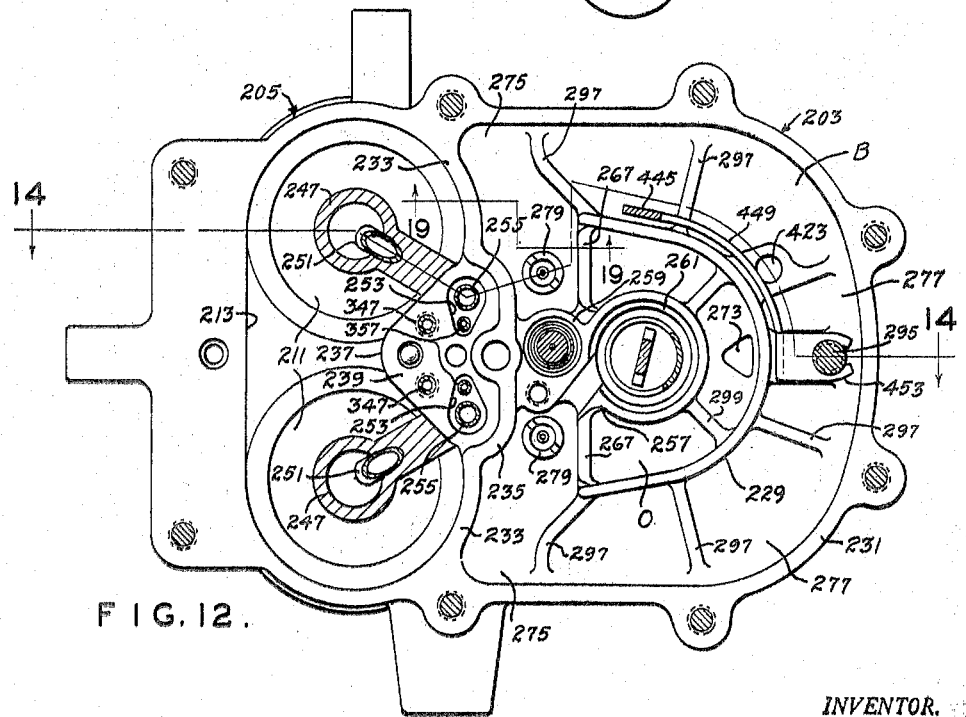
Figure 13:
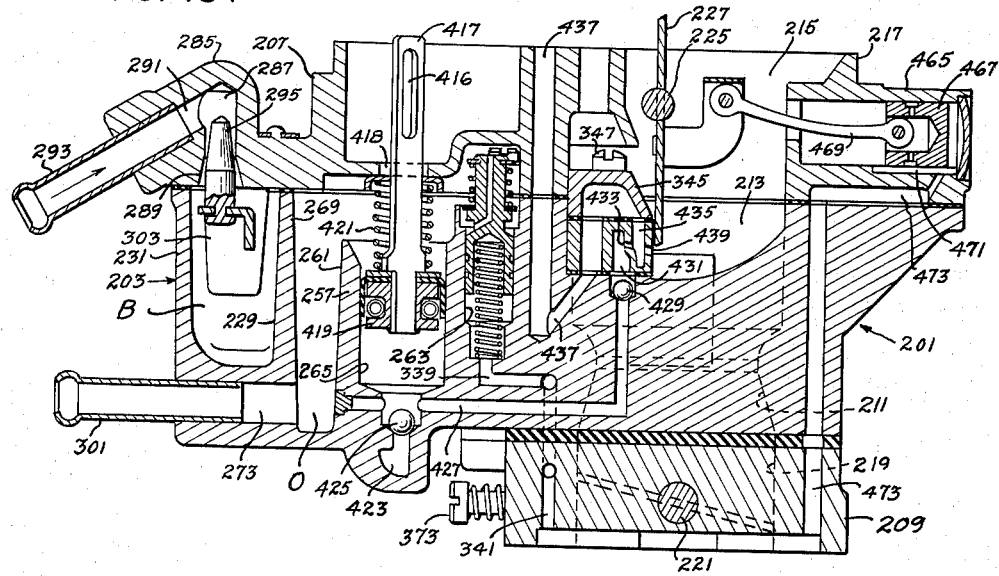
Figure 14:
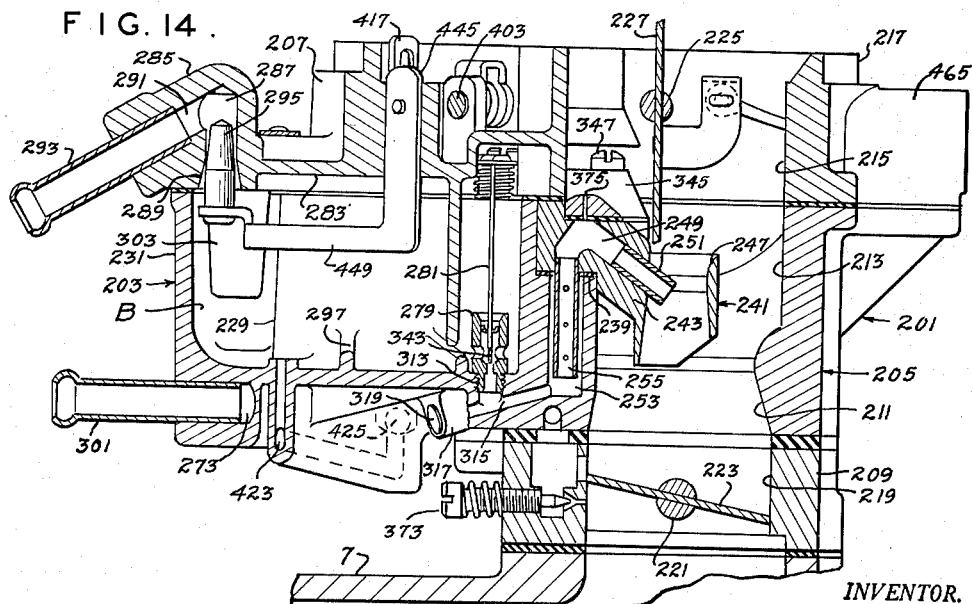
Figure 18:
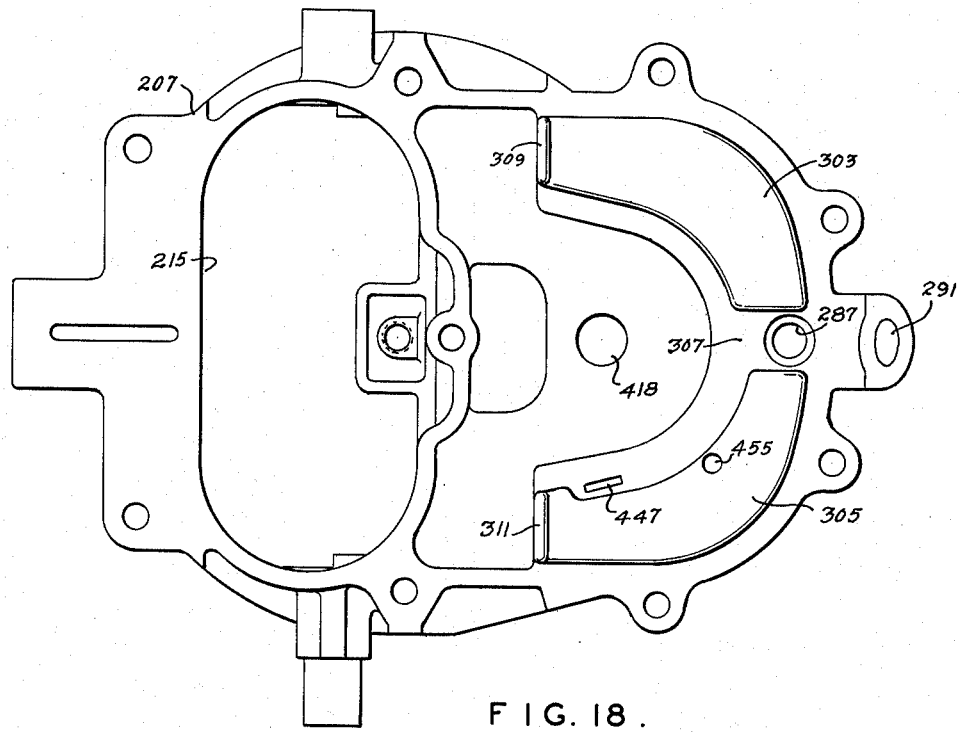
Figure 19:
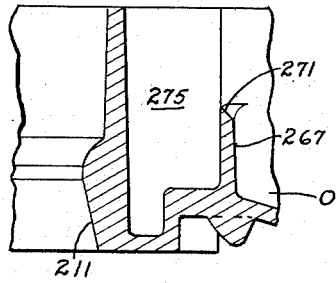

FIGS. 5, 6, 7 and 8 are sections of the pump taken on lines 5—5, 6—6, 7—7 and 8—8, respectively, of FIG. 3;

FIG. 9 is a plan of the carburetor per se;

FIG. 10 is an end elevation of the carburetor (its right end as viewed in FIG. 2, which is its front end as mounted on the engine);

FIG. 11 is a side elevation of the carburetor (its left side as mounted on the engine);

FIG. 12 is a view essentially in horizontal section on line 12—12 of FIG. 10, and with parts additionally broken away and shown in section, showing the main body of the carburetor as it appears with the air horn section of the carburetor removed;

FIG. 13 is a vertical longitudinal section taken on line 13—13 of FIG. 9;

FIG. 14 is a vertical section taken essentially on line 14—14 of FIG. 12;

FIG. 15 is an idealized section illustrating an idle system of the carburetor;

FIG. 16 is a vertical transverse section taken on line 16—16 of FIG. 9;

FIG. 17 is an enlarged fragment of FIG. 13;

FIG. 18 is a bottom plan view of the air horn section per se of the carburetor;

FIG. 19 is a vertical section taken on line 19—19 of FIG. 12; and

Figure 20:
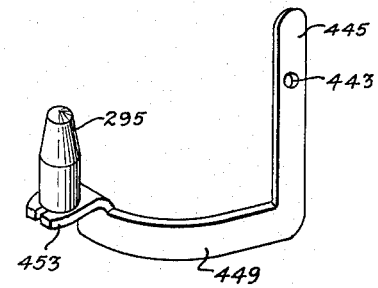

FIG. 20 is a perspective of a bar and metering pin assembly used in the carburetor.

Corresponding reference characters indicate corresponding parts throughout the several views of the drawings.

Figure 1:
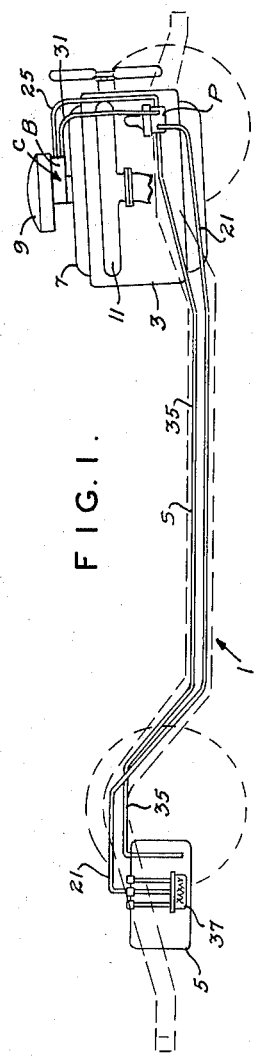

Referring to FIG. 1 of the drawings, there is indicated at 1 the frame of an automotive vehicle having engine 3 at the front. The engine is adapted to be supplied with fuel from fuel tank 5 at the rear of the vehicle by a recirculating fuel system S of this invention which includes pump P and carburetor C of this invention mounted on the engine. Pump P is mounted on the side of the engine. Carburetor C is mounted on intake manifold 7 on top of the engine. An air filter for carburetor C is indicated at 9. The exhaust manifold of the engine is indicated at 11.

Figure 4:
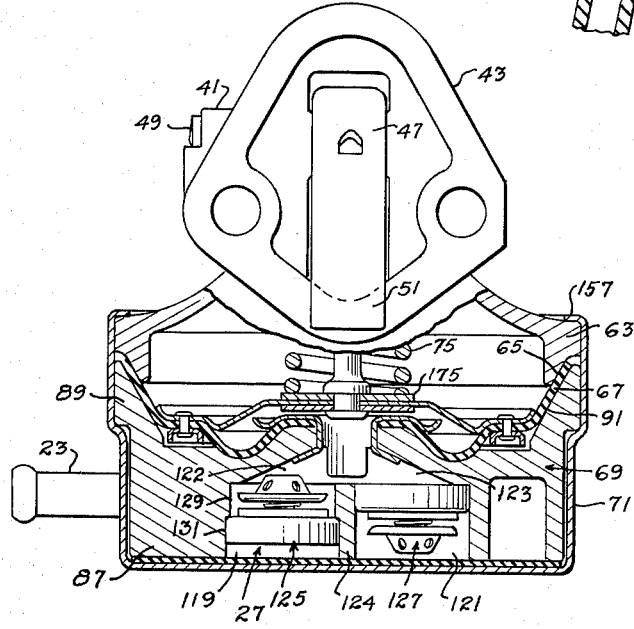
FIG. 4 is a section of the pump taken on line 4—4 of FIG. 2.

Carburetor C is a floatless carburetor, having a fuel bowl B and an overflow chamber O (see FIGS. 12, 13 and 16). Fuel spills over into the overflow chamber from the bowl on exceeding a predetermined level in the bowl, as will be made clear. Pump P is a duel diaphragm pump comprising a primary pump section 17 (see FIG. 2) having an inlet nipple at 19 (see FIG. 3) to which is connected a fuel supply line 21 (see FIG. 1) from fuel tank 5 and an outlet nipple at 23 (see FIG. 3) to which is connected a fuel delivery line 25 (see FIG. 1) leading to the fuel bowl B of carburetor C. It also comprises a scavenger pump section 27 (see FIG. 4) having an inlet nipple at 29 (see FIG. 3) to which is connected a fuel line 31 (see FIG. 1) from the overflow chamber O of the carburetor C and an outlet nipple at 33 (see FIG. 3) to which is connected a fuel return line 35 (see FIG. 1) leading back to the tank 5. As shown in FIG. 1, an electric pump 37 may be provided in tank 5 for pumping fuel from the tank through line 21 to the primary pump section 17. This is optional.

Pump P comprises a rocker arm housing 41 which is open at one end (its left end as appears in FIG. 2), this end being referred to as the inner end of the housing. The housing is of generally rectangular form in vertical cross section, of decreasing height from its inner end to its outer end (which is closed). At its inner end it has a flange 43 for attaching it to the engine 3. A rocker arm 47 is pivoted at 49 in the housing 41 for rocking motion on a horizontal axis transverse to the housing. Arm 47 has a downwardly extending end portion 51 which projects out of the open inner end of the housing. Arm 47 is biased to rock clockwise as viewed in FIG. 2 by a spring 53. When the pump is mounted on the engine, the free end portion 51 of rocker arm 47 is engaged by a push rod 55 actuated by an engine-driven eccentric or cam 57. On rotation of the cam through half a revolution from its FIG. 2 position (wherein the low point of the cam engages the push rod), arm 47 is rocked counterclockwise from its FIG. 2 position against the bias of spring 53. Spring 53 is adapted to return the arm clockwise during the succeeding half-revolution of the cam.

Extending downward from the rocker arm housing 41 at its outer end is a hollow conical pump head housing 59. An opening 61 is provided between the interior of the housing 41 and the hollow head 59 at the top of the latter. Head 59 has a depending rim 63 at its lower end. This rim has a conical exterior surface 65 converging in downward direction to the bottom edge thereof. This conical surface 65 constitutes a seating surface for the outer margin of an annular diaphragm 67 consisting of a relatively thin disk of flexible fuel-resistant material, such as a suitable synthetic rubber, which, in unstressed condition, is flat or substantially flat. The outer margin of the diaphragm is clamped against the conical seating surface 65 on rim 63 of the pump head 59 by pump body 69 held in assembly with the head by a sheet metal cup 71. The diaphragm is adapted to be pulled or flexed upward by a diaphragm-actuating rod 73 and to be flexed downward by a spring 75. Rod 73 extends upward through head 59 and through the opening 61 at the top of the head into the rocker arm housing 41. The rocker arm 47 has a slot 77 at its end in housing 41 receiving the rod 73. The rod has a collar 79 at its upper end engageable by this end of the arm 47. The rod extends slidably through an oil seal and rod guide 81 held in an annular recess at the top of the head 59 by the reaction on a seal retainer ring 83 of the spring 75, this spring being a coil compression spring surrounding the rod. Housing 41 is mounted on the engine 3 in communication with the crankcase of the engine, and seal 81 keeps oil fumes from the crankcase out of the head 59, which constitutes an enclosure for the diaphragm and the spring 75. The arrangement is such that when arm 47 is rocked in counterclockwise direction by the cam 57, it lifts the rod 73 and pulls the diaphragm upward. This loads the spring 75. Then when the arm 47 rocks clockwise, spring 75 is adapted to drive the diaphragm (and rod 73) downward.

Pump body 69 is made essentially in the form of a cup having a relatively thick circular horizontal bottom wall 87 and an upstanding annular wall 89 which is cylindrical on the outside and of conical form on the inside matching the conical surface 65 on the rim 63 of the pump head 59. The interior conical surface of wall 89 is designated 91. It diverges (flares outward) in upward direction away from the bottom wall 87 of the cup-shaped pump body 69, the angle of flare being about 30° from vertical, for example. At the center of the bottom of the cup-shaped pump body 69 is an upwardly projecting boss or hub 93. This hub, as shown, has a flat top surface 95 and a conical periphery 97 which flares outward in downward direction, merging into a shallow annular groove 99 of arcuate form in cross section in the bottom wall of the cup-shaped body 69.

Outward of the groove 99, the thick bottom wall 87 of the cup-shaped pump body 69 has two holes 101 and 103 at opposite sides thereof extending down from the inside (the top) of the bottom wall 87 to cylindrical recesses 105 and 107, respectively, extending up from the bottom of the bottom wall 87. Recess 105 contains a primary inlet check valve 109; recess 107 contains a primary outlet check valve 111. Recess 105 has an upper cylindrical portion 113 and a lower slightly larger cylindrical portion 115. Recess 107 is of uniform diameter throughout, its diameter being the same as that of the larger portion 115 of recess 105.

Hub 93 has a center hole 117 extending down from the upper end thereof with branch connections as indicated at 122 and 123 with the upper ends of two vertical cylindrical recesses 119 and 121 in body 69 located closely adjacent one another on opposite sides of the vertical axis of body 69. The axes of the cylindrical recesses 119 and 121 lie in a vertical plane (including the vertical axis of body 69) which extends transversely in respect to the rocker arm housing 41 midway between recesses 105 and 107. Recesses 119 and 121 are separated by what amounts to a vertical partition 124 (see FIG. 4) extending up from the bottom of the bottom wall 87 of body 69. Recess 119 contains a scavenger inlet check valve 125; recess 121 contains a scavenger outlet check valve 127. Recess 119 has an upper cylindrical portion 129 and a lower slightly larger cylindrical portion 131 of the same diameter as recess 107. Recess 121 is of uniform diameter throughout, its diameter being the same as that of recess 107.

As appears in FIGS. 3 and 5–8, the cup-shaped pump body 69 is formed with four additional bottom recesses 133, 135, 137 and 139 adjacent recesses 105, 107, 119 and 121, respectively. Recess 133 is adapted for communication with the lower part of primary inlet recess 105 below the primary inlet check valve 109 via a notch 141 (see FIGS. 3 and 5) in the bottom of the portion of body 69 between recesses 133 and 105. Primary outlet recess 107 is adapted for communication from the portion thereof below primary outlet check valve 111 to recess 135 via a notch 143 (see FIGS. 3 and 6) in the bottom of the portion of body 69 between recesses 107 and 135. Recess 137 is adapted for communication with the lower part of scavenger inlet recess 119 below the scavenger inlet check valve 125 via a notch 145 (see FIGS. 3 and 7) in the bottom of the portion of body 69 between recesses 137 and 119. Scavenger outlet recess 121 is adapted for communication from the portion thereof below scavenger outlet check valve 127 to recess 139 via a notch 147 in the bottom of the portion of body 69 between recesses 121 and 139. The primary inlet nipple 19 leads into recess 133. The primary outlet nipple 23 leads out of recess 135. The scavenger inlet nipple 29 leads into recess 137. The scavenger outlet nipple 33 leads out of recess 139.

The diaphragm 67 has a center hole 149 having a diameter approximating the diameter of the center hole 117 in the hub 93. The outside diameter of the diaphragm, in its flat condition, is greater than the outside diameter of the annular wall 89 of the cup-shaped pump body 69. The central portion of the diaphragm around the center hole 149 therein engages the flat top surface 95 of the hub 93, and is clamped in fuel-tight engagement therewith by a tubular clamp element 151 extending through hole 149 and the center hole 117 in the hub and having an upper flange 153 bearing down on the central portion of the diaphragm with sufficient pressure to make the requisite fuel-tight seal between the diaphragm and the top of the hub. As shown in FIG. 4A, the tubular clamp element has lower end portions 154 bent over after insertion of the element in hole 117 to maintain the parts assembled. An alternative is shown in FIG. 4B in which the tubular clamp element is press-fitted in hole 117. The outer margin of the diaphragm is clamped between the conical surface 65 on the rim 63 of pump head 59 and the conical interior surface 91 of the annular wall 89 of pump body 69. The latter is contained in the sheet metal cup 71 and is held in assembly with head 59 by spinning the rim 157 of the sheet metal cup over on top of rim 63 of head 59. A gasket 158 is provided in the bottom of the sheet metal cup for sealing the recesses 105, 107, 119, 121, 133, 135, 137 and 139. The assembly is carried out in such manner as to provide sufficient compression of the outer margin of the diaphragm to provide a fuel-tight seal between the outer margin of the diaphragm and conical surface 91, and sufficient compression of gasket 158 to seal the stated recesses. The diaphragm, being sealed to the cup-shaped pump body 69 at its outer margin and at its inner margin around its center hole 149, closes off an annular space 159 in body 69 around the hub 93. This space 159 constitutes the primary pump chamber.

A sheet metal casing 161 of inverted cup shape or hat shape is secured as by rivets 163 to the top of the diaphragm. This casing has an outwardly extending bottom flange or rim 165 with a turned-up peripheral lip 167. The inside diameter of flange 165 approximates the outside diameter of annular groove 99 and the outside diameter of flange 165 is somewhat less than the inside diameter of the rim 63 of the head 59. An intermediate flat annular portion 67a of the diaphragm is compressed between flange 165 of casing 161 and a washer 169, rivets 163 extending through rivet holes in the flange, the diaphragm and the washer, so as to provide a fuel-tight seal between the diaphragm and the flange 165. A scavenger pump chamber 171 is thereby defined between casing 161 and the annular portion of the diaphragm bounded by the casing flange 165. When the pump parts are assembled as in FIG. 2, this portion of the diaphragm assumes the form of an annular downwardly directed loop 67b fitting in the annular groove 99. The initial assembly of the casing 161 and the diaphragm is such as to provide slack in the diaphragm for this purpose. The outer peripheral marginal portion 67c of the diaphragm lying outward of flange 165 is distorted to conical form and engages conical surface 91 of wall 89 of pump body 69. Rod 73 has its lower end secured as by riveting as indicated at 173 to the center of the top of casing 161, with washers 175 to provide a fuel-tight seal at the riveted connection. The lower end of spring 75 engages the top washer 175.

The check valves 109, 111, 125 and 127, as shown, are all identical. Each comprises a circular valve seat 179 having a central hole 181 (see FIGS. 3 and 5) and a series of ports 183, such as arcuate slots, around the hole 181. Press-fitted in the hole 181 is a hollow stem 185 closed at its end in the hole, and having at its other end a mushroom head constituting a spring seat 187. A ring-shaped disk valve member 189, which may be made of a suitable oil-resistant synthetic rubber for cushioned sealing, is slideable on the stem 185, and is biased toward engagement with the valve seat by a coil compression spring 191 surrounding the stem reacting from the seat 187. As to each of the four check valves, the valve seat 179 is press-fitted and positioned horizontally in the respective recess 105, 107, 119, 121, with the disk valve member 189 and stem 185 on the appropriate side for inward or outward opening of the valve member, as the case may be. Thus, the stems 185 of the primary and scavenger inlet valves 109 and 125 extend upward, and the stems 185 of the primary and scavenger outlet valves 111 and 127 extend downward. The circular valve seats 179 of the primary and scavenger inlet valves 109 and 125 are press-fitted in the larger cylindrical portions 115 and 131 of recesses 105 and 119 and engage the annular shoulders at the top of portions 115 and 131. The circular valve seats 179 of the primary and scavenger outlet valves are press-fitted all the way into recesses 107 and 121 and engage the annular shoulders at the upper ends of these recesses.

In the operation of the dual pump P, and upon each revolution of the cam 57, starting with the cam in the FIG. 2 position wherein its low point engages the push rod 55, the rocker arm 47 swings counterclockwise away from its FIG. 2 position and then swings back clockwise to its FIG. 2 position. With the rocker arm in the FIG. 2 position, the end of the rocker arm in housing 41 is at the lower limit of its movement. Accordingly, rod 73 is at the lower limit of its vertical sliding movement, casing 161 on the lower end of rod 73 is at the lower limit of its range of vertical movement, and the slack portion of the diaphragm 67 between the clamped inner and outer margins of the diaphragm is at the limit of its downward flexure. Under these circumstances, the slack portion of the diaphragm hugs as closely as possible the top of the bottom wall 87 of the cup-shaped pump body 69, having loop portion 67b in the annular groove 99, flat portion 67a surrounding the loop portion where it is sandwiched between the flat annular flange 165 of casing 161 and the washer 169, and flaring portion 67c hugging the conical surface 91 of the annular wall 89 of body 69 on out to the clamped outer margin of the diaphragm. The top of casing 161 is contiguous to the top of the tubular clamp element 151, casing 161 closely surrounding the humped-up central portion of the diaphragm. Accordingly, both the primary pump chamber 159 and the scavenger pump chamber 171 are fully contracted.

When the rocker arm 47 is swung counterclockwise by the cam 57, the rod 73 is pulled up against the downward bias of spring 75 to the upper limit of its stroke. Casing 161 is pulled up to the upper limit of its stroke (see FIG. 4A) and pulls up the slack portion of diaphragm 67. Accordingly, both the primary and scavenger chambers 159 and 171 are expanded to the limit of their expansion. This draws fuel from the tank into the primary chamber 159, primary inlet valve 109 opening for this purpose, and draws overflow fuel from the carburetor into the scavenger chamber 171, scavenger inlet valve 125 opening for this purpose. When the rocker arm 47 swings clockwise, spring 75, having become loaded due to the upward movement of casing 161, becomes effective to drive the casing 161 and rod 73 downward, thereby contracting both the primary and scavenger pump chambers 159 and 171 with the result that fuel is forced out of the primary chamber 159 and through line 25 to the fuel bowl of the carburetor (primary outlet valve 111 opening and primary inlet valve 109 closing for this purpose), and fuel is forced out of the scavenger chamber 171 and through return line 35 to the tank 5 (scavenger outlet valve 127 opening and scavenger inlet valve 125 closing for this purpose).

The extent to which casing 161 is driven downward by the spring 75 depends primarily upon the back pressure in the primary chamber 159. If the back pressure is high (i.e., if flow of fuel through line 25 to the fuel bowl of the carburetor is relatively restricted), the downward movement of casing 161 and consequently the output of the pump will be restricted. Conversely, if the back pressure is low, the downward movement of casing 161 will be greater and, if sufficiently low, the casing 161 will move downward to its lower limit in which it appears in FIGS. 2 and 4. The back pressure is controlled at the carburetor, as will become apparent.

Referring to FIGS. 9–16, carburetor C is shown to be a dual downdraft carburetor, comprising a main body 201 constituted by a casting formed to provide a forward fuel bowl section 203 and a rearward mixture conduit section 205, the terms "forward" and "rearward" relating to the position of the carburetor as mounted on the engine 3. Secured on top of the body 201 is a casting 207 which is referred to as the air horn section of the carburetor. Secured to the bottom of the mixture conduit section 205 of the body 201 is a casting 209 which is referred to as the throttle body section of the carburetor.

The rearward mixture conduit section 205 of the body 201 is formed to provide two vertical mixture conduits or barrels 211 located side-by-side. Each of the two mixture conduits is of venturi form, and both mixture conduits extend down from an upper recess 213 in the top of the body 201 to the bottom of the body 201. The air horn section 207 has an air inlet 215 registering with recess 213 for admission of air to the two mixture conduits, and a rim 217 for attachment of the air filter 9 shown in FIG. 1 for filtering air supplied to the mixture conduits. Throttle body 209 is formed with two throttle bores 219 registering with the lower ends of the respective mixture conduits 211. A throttle shaft 221 is journalled in the throttle body 209, extending transversely across the bores 219 and carrying two throttle valves 223, one in each bore. A choke shaft 225 is journalled in the air horn section 207 extending transversely across the air inlet 215 and carrying a choke valve 227. The choke valve 227 is unbalanced to open and, when fully open, extends substantially vertically. When vertical, its lower portion is accommodated in the recess 213 at the top of the main body 201.

The fuel bowl section 203 of the main body 201 is essentially hollow, being formed to provide the fuel bowl B and the overflow chamber O, with the fuel bowl surrounding the overflow chamber. The fuel bowl is separated from the overflow chamber by a wall or partition 229 (see FIGS. 12, 13 and 16) extending up from the bottom of the hollowed-out fuel bowl section of the main body, this wall 229 being spaced inward from the outer wall 231 of the fuel bowl section. The main body 201 has a transverse wall 233 dividing the fuel bowl section 203 from the mixture conduit section 205. This wall 233 has a central forward offset 235 and a central rearward offset 237 of generally triangular shape in plane (see FIG. 12). Triangular offset 237 has a flat horizontal upper surface 239 below the top of the main body 201 constituting a shoulder on which is secured a venturi cluster generally designated 241. This cluster comprises a body 243 secured on shoulder 239 and two arms each designated 245 radiating from the body 243 over the two mixture conduits, each arm having a primary venturi 247 at its outer end generally coaxial with the respective mixture conduit. Each arm 245 has a fuel passage 249 opening into the respective primary venturi via a fuel nozzle 251 pressed into the outer end of the passage 249. Triangular offset 237 is formed with two fuel wells each designated 253 extending down from the top thereof on opposite sides of the longitudinal center line of the carburetor. A main fuel tube 255 extends down into one of these wells from the inner end of one fuel passage 249, and an identical main fuel tube 255 extends down into the other of these wells from the inner end of the other fuel passage 249.

The fuel bowl section 203 of the main body 201 of the carburetor C is integrally formed with a cylinder block 257 extending forward from the central forward offset 235 of the dividing wall 233 approximately to the center of the fuel bowl section 203. The rearward portion of this block constitutes a vertical step-up cylinder 259 and the forward portion of this block constitutes a vertical accelerating pump cylinder 261. Bore 263 of the step-up cylinder 259 extends down from the top of the rearward portion of the block. Bore 265 of the pump cylinder extends down from the top of the forward portion of the block (which is of lower height than the rearward portion). The wall or partition 229 which separates the fuel bowl B and the overflow chamber O surrounds the pump cylinder 261 and has weir portions 267 extending laterally between it and block 257 in a vertical transverse plane intermediate the step-up and pump cylinders 259 and 261 (FIGS. 12 and 16). Wall 229 extends around the pump cylinder 261 from the outer end of one weir portion to the outer end of the other weir portion. The arcuate portion of wall 229 extends up to the top of the fuel bowl section, as indicated in FIG. 16. Weir portions 267 have bevelled upper edges 271 (see FIG. 19) below the top of the fuel bowl section. Extending forward from the bottom of overflow chamber O in main body 201 is an outlet passage or drain 273 (see FIG. 13).

Thus, fuel bowl B has two lateral rearward chambers each designated 275 on opposite sides of the step-up cylinder 259 which are interconnected by the forward U-shaped chamber 277 extending around the overflow chamber O. The overflow chamber O is also of U-shape, extending around the accelerating pump cylinder 261. Fuel in the fuel chamber B will flow over the weirs 267 from the rearward fuel bowl chambers 275 into the overflow chamber O when the level of fuel in the fuel chamber B exceeds the level of the sharp upper edges 271 of the weirs.

The overflow fuel is adapted to drain out of the overflow chamber through the outlet passage or drain 273. Thus, by maintaining delivery of fuel to the fuel bowl, when the engine is in operation, at a rate faster than the rate at which fuel is consumed by the engine, fuel may be maintained in the fuel chamber B and more particularly in the rearward lateral chambers 275 at a substantially constant level corresponding to the level of the upper edges 271 of the weirs. This maintains a substantially constant head of fuel in the fuel bowl chambers 275 for accurate high-speed metering of fuel by the jets 279 and step-up rods 281 to the engine in accordance with engine requirements.

The air horn section 207 has a forward portion 283 which constitutes a cover for the fuel bowl section 203 of the main body 201. At the forward end of the air horn section is an upwardly extending central boss 285. Extending upward from the bottom of the air horn section into this boss is a vertical cylindrical hole 287 which is countersunk at its open lower end as indicated at 289. A hole 291 is drilled at an angle in the boss to an intersection with the upper end of the vertical hole 287. Holes 291 and 287 constitute the fuel inlet for the fuel bowl B, a fuel inlet nipple 293 being pressed in the outer end of the angled hole 291, the vertical hole 287 being located above the forward end portion of the U-shaped forward fuel bowl chamber 277. The rate of flow of fuel into the fuel bowl B is adapted to be controlled by a metering pin 295 having a tapered upper end movable up and down in the vertical hole 287 by means to be described. Accordingly, fuel entering the fuel bowl B through hole 289 divides and flows around through the two sides of the U-shaped fuel bowl chamber 277 to the rearward fuel bowl chambers 275. Sediment in fuel in the U-shaped fuel bowl chamber 277 tends to settle to the bottom thereof, where it is trapped from being carried into the rearward fuel bowl chambers 275 by baffles 297 extending across the U-shaped fuel bowl chamber from the outer fuel bowl wall 231 to the inner wall 269. Overflow chamber O also has sediment baffles 299 extending between the inner wall 269 and the accelerating pump cylinder 261. Fuel flowing over weirs 267 flows forward in the two sides of the U-shaped overflow chamber O over these baffles 299 to the forward end of the overflow chamber, and thence out through drain 273. The latter has an outlet nipple 301 pressed in its outer end.

The air horn section 207 is integrally formed with bosses 303 and 305 (see FIGS. 16 and 18) on its bottom which substantially fill the space in the U-shaped fuel bowl chamber 277 above the level of fuel therein as determined by the height of the upper edges of the weirs 267. These bosses are separated at the forward end of the air horn section by a gap 307 through which fuel may flow down into the fuel bowl from the vertical hole 287. The bosses curve around and rearward from the forward end of the air horn section and have downwardly extending baffles 309 and 311 at their rearward ends which extend down nearly to the bottom of the fuel bowl. With bosses 303 and 305 substantially filling the forward U-shaped fuel bowl chamber 277 and with baffles 309 and 311 between the rearward fuel bowl chambers 275 and the rearward ends of the two sides of the U-shaped fuel bowl chamber 277, forward surging of fuel from the rearward chambers 275 into the sides of the U-shaped chamber 277 on sudden deceleration of the vehicle (as on a panic stop of the vehicle) such as would drop the head of fuel in chambers 275, and rearward surging of fuel from U-shaped chamber 277 into the rearward chambers 275 on sudden acceleration of the vehicle such as would increase the level of fuel in chambers, are both substantially precluded. Also, while forward surging of fuel from the rearward chambers may result in some fuel spilling over the weirs 267 into the overflow chamber, since chambers 275 are relatively small and since the weirs are relatively narrow as regards the total width of chambers 275, whatever drop in the head of fuel in chambers may occur is minor. With step-up cylinder 259 between the relatively small chambers 275, cornering of the vehicle has at most only minor effect on the head of fuel in these chambers.

The two metering jets 279 are threaded in tapped holes 313 in the bottoms of rearward fuel bowl chambers 275 at opposite sides of the step-up cylinder 259 in close proximity to the respective fuel wells 253. Each hole 313 extends downward into an inclined fuel passage 315 drilled in a boss 317 on the bottom of the main body 201 to an intersection with the lower end of the respective fuel well 253. The outer end of each passage 315 is plugged as indicated at 319. The arrangement is such that, as to each mixture conduit 211, fuel for high-speed operation (i.e., throttle open) is drawn from the respective fuel chamber 275 down through the respective metering jet 279, the respective passage 315, the respective well 253, the respective main fuel tube 255 and the respective fuel passage 249 and nozzle 251. With a constant head of fuel in each chamber 275 over the respective metering jet 279, the rate of flow of fuel is dependent upon the difference in air pressure on the fuel in the fuel bowl B and at the outlets of nozzles 251, and on the setting of the two step-up rods 281.

As shown in FIGS. 13, 15 and 17, the two step-up rods 281 extend downward into the jets 279 from a common head 321 on the upper end of a step-up piston 323 slidable in the bore 263 of the step-up cylinder 259. The piston and the step-up rods are biased upward to a raised retracted position by a spring 325 which reacts from the bottom of bore 263 against the bottom of the piston. The raised retracted position of the piston and the rods is determined by engagement of the head 321 with the head of a stop screw 327. The piston has a reduced upper end portion 329 carrying the head 321. A compression spring 331 surrounds portion 329 of the piston, reacting from a collar 333 slidable on portion 329 upward against the head 321. On downward movement of the piston, collar 333 engages an annular shoulder 335 adjacent the upper end of the step-up cylinder bore 263, and then the force of spring 331 is added to the force of spring 325 to supplement the upward bias on the piston and step-up rods. Piston 323 has a vent 337. Body 201 is formed with a passage 339 extending from the lower end of the step-up cylinder bore registering with a passage 341 in the throttle body 209. These passages 339 and 341 together constitute a vacuum passage placing the lower end of step-up cylinder bore 263 in communication with the intake manifold 7 of the engine 3 for operation of the piston 323 and step-up rods 281 in response to intake manifold vacuum.

Each step-up rod 281 has a lower end portion or step 343 of reduced diameter. These steps are raised out of the orifices of the metering jets 279 when piston 323 and rods 281 are raised. With steps 343 out of the metering jet orifices, the restriction imposed by the jets to flow of fuel from fuel bowl chambers 275 to nozzles 251 is a minimum, and fuel may flow to nozzles 251 at a rate such as to provide a relatively rich or "power" air/fuel mixture to the engine. This condition occurs, for example, during high load operation of the engine (wide open throttle) when the vacuum in the intake manifold of the engine and hence in the lower end of the step-up cylinder 259 is relatively low. During intermediate load operation of the engine (part-throttle operation), with consequent intermediate vacuum in the lower end of the step-up cylinder, the piston 323 is drawn part-way down against the bias of spring 325 only to the point where steps 343 are entered in the metering jet orifices, and the flow through the orifices is restricted so that a leaner mixture is supplied to the engine. During light load operation of the engine, with consequent high vacuum in the lower end of the step-up cylinder, the piston 323 is drawn all the way down against the bias of both springs 325 and 331 to the point where full-diameter portions of the rods 281 above the steps 343 are entered in the metering jet orifices, and the flow through the orifices is further restricted so that a still leaner "economy" mixture is supplied to the engine.

As disclosed in FIG. 15, for example, a head 345 is secured on top of the cluster body 243 by two tubular screws 347 extending through holes 349 in the head, holes 351 in body 243 and threaded in tapped holes 353 in offset 237. Head 345 closes off fuel passages 249. Body 243 has two vertical holes 355 and carries two idle tubes 357 extending down from these holes into the fuel wells 253 in offset 237. Each tubular screw has radial ports 361. Body 243 has grooves 363 in the top closed off by head 345 to provide passages from the upper ends of vertical holes 355 to holes 349 and ports 361. Holes 353 are connected by passages 354, respectively, to recesses 367 in throttle body 209 adjacent the throttle bores 219. An idle discharge port 369 and an idle needle port 371 extend from each recess 367 into the respective throttle bore 219. For each idle needle port 371 there is an idle mixture adjusting screw 373 threaded in the throttle body 209. Vents for the fuel wells 253 are provided in the cluster body 243 and head 345 as indicated at 375 (FIG. 14).

From the above, it will be apparent that fuel for idling is supplied to each throttle bore 219 via the respective idle tube 357, vertical hole 355, horizontal groove or passage 363, radial ports 361 in the screw 347 and down through the screw and hole 353 to recess 367, and thence through ports 369 and 371. Air bleeds into this idling system for mixture with the fuel through the upper end of the tubular screw. Each screw is formed with a restriction 377 which acts as an economizer. Each idle discharge port 369 is a vertical slot located so that it is partially covered by the respective throttle valve 223 when the throttle valves are seated in the throttle bores 219. Each idle needle port 371 is located below the respective idle discharge port 369.

Secured on the left end of the throttle shaft 221 is a throttle arm 379 (see FIG. 11). This is adapted to receive a connection from the usual accelerator pedal of the vehicle, with the usual spring in the connection tending to rotate the throttle arm and shaft in throttle-closing direction (which is counterclockwise as viewed in FIGS. 11, 13 and 14). The throttle arm 379 is engageable with a screw 381 adjustably threaded in a lug 383 on the throttle body 209 for determining the normal idle position of the throttle valves 223. A fast idle cam 385 is journalled on the left end of the choke shaft 225. This is weighted as indicated at 387 to tend to swing clockwise as viewed in FIG. 11 and thereby to tend to back off from starting position. The backing off of the fast idle cam is controlled by engagement of a tail 389 of the cam with a tang 391 on a lever 393 fixed on the choke shaft 225. The arrangement is such that when the choke valve 227 is closed, the fast idle cam is held by tang 391 in starting position. When the choke valve opens, tang 391 allows the cam to back off from its starting position. When the choke valve closes, tang 391 pushes the cam back to starting position. A fast idle arm 395 is pivoted at 397 on the left side of the main body 201. This carries a fast idle screw 399 adapted to engage the fast idle cam. A fast idle link 401 connects throttle arm 379 and fast idle arm 395. The arrangement is such that as the throttle arm swings in throttle-closing direction (counterclockwise as viewed in FIG. 11), arm 395 is swung counterclockwise to swing the screw 399 toward the fast idle cam. Engagement of screw 399 with the cam determines a fast idle position of the throttle arm 379 and the throttle valves 223.

A shaft 403 (FIGS. 9 and 11) is journalled in bearings 405 and 407 on the air horn section 207. A link 409 connects throttle arm 379 and a crank 411 secured on the outer end of the shaft 403. A crank having two arms 413 and 415 is secured on the inner end of shaft 403. Arm 413 extends into an elongate slot 416 (FIGS. 13 and 16) in an accelerating pump rod 417, which extends vertically through an opening 418 in air horn section 207. Rod 417 carries pump piston 419 at its lower end slidable in bore 265 of the accelerating pump cylinder 261. A coil compression spring 421 surrounding the pump rod 417 biases the pump piston 419 and pump rod 417 downward. The arrangement is such that with the throttle valves 223 closed, arm 413 holds the pump rod and pump piston in the raised position in which they appear in FIG. 13. As the throttle valves are opened, link 409 rotates shaft 403 in such direction as to move the free end of arm 413 downward, and spring 421 thereupon drives the pump piston 419 downward through a pumping stroke. Fuel is adapted to enter the lower end of the pump cylinder 261 from the U-shaped fuel bowl chamber 277 via a pump inlet passage 423 (see FIGS. 12 and 13) in body 201 provided with an inlet ball check valve 425. Fuel is adapted to be discharged from the pump cylinder 261 on a downward stroke of the pump piston 419 through a pump delivery passage 427 provided in the main body 201 extending to the shoulder 239 where it contains an outlet ball check valve 429. The venturi cluster body 243 (FIG. 13) is formed with a bottom recess 431 for receiving fuel from passage 427, and has pump jets 433 providing for communication from recess 431 to a top recess 435 in body 243. Fuel entering recess 435 from recess 431 is mixed with air entering recess 435 via air passage 437 provided in the air horn section 207, the main body 201, the cluster 243 and the head 345, and the mixture is sprayed out into the mixture conduits 211 through orifices 439 in the cluster body 243.

A pin 441 received in crank arms 413 and 415 extends through a hole 443 at the upper end of a bar 445 (see FIGS. 9, 12, 14, 16 and 20) for actuating the fuel inlet metering pin 295. This bar 445 is vertically slidable in a guide slot 447 (see FIG. 18) in the air horn section 207. It extends down through this slot into the U-shaped fuel bowl chamber 277 and has a curved arm 449 extending from its lower end in a space 451 between boss 305 and the wall 229 around the forward end of chamber 277. At its forward end, arm 449 has a split ear 453 in which is pinched the lower end of the metering pin 295. The arrangement is such that as the throttle arm 379 rotates clockwise to open the throttle valves 223, bar 445 is driven downward to lower the metering pin 295, and vice versa. When the throttle valves 223 are at idle, the metering pin 295 occupies a raised position in which the annular orifice around the tapered upper end portion of the pin is of minimum area for minimum flow of fuel into the fuel bowl B. As the metering pin moves down, the area of this annular orifice increases for increased flow of fuel into the fuel bowl. The position of the metering pin determines the back pressure in the primary chamber 159 of pump P.

The air horn section 207 is provided with a hole 455 for venting vapors from the fuel bowl B to the outside of the carburetor. This vent hole is adapted to be closed by a vent valve constituted by a leaf spring 457 having one end fixed at 459 on the air horn section and carrying a valve button 461 for closing the vent hole. The free end of the leaf spring 457 is engageable by an arm 463 on shaft 403, the arrangement being such that spring 457 is bent up and button 461 is raised to open up the vent hole 455 when the throttle valves 223 are at idle, spring 457 being released for closing off the vent hole as the throttle valves are opened. Thus, the fuel bowl B is vented via hole 455 at idle, the hole being closed whenever the throttle valves are opened.

The air horn section 207 is formed with a choke cylinder 465 in which is slidable a choke piston 467. Piston 467 is connected to the choke valve 227 by a link 469. The choke cylinder is formed with a longitudinal groove 471 adapted to by-pass air around the piston. Passaging as indicated at 473 is provided for placing the outer end of the choke cylinder in communication with the intake manifold of the engine so that piston 467 is responsive to manifold vacuum. Choke shaft 225 has an arm 475 at its right end adapted for connection of a link from a thermostatic control (not shown) responsive to engine temperature to control the choke valve and the fast idle cam in response to engine temperature. This thermostatic control may, for example, include a thermostatic coil located in a heat pocket in the cross-over passage of the exhaust manifold of the engine. The fast idle arm 395 has an unloader extension 477. This is adapted to engage the tail 389 of the fast idle cam 385 when the arm 395 swings clockwise on full opening of the throttle valves 223 thereby to open the choke valve 227 for unloading. This opening of the choke valve is accomplished by engagement of tail 389 with tang 391 on lever 393.

Line 25 extending from the primary outlet nipple 23 of pump P is connected to the fuel inlet nipple 293 of carburetor C. Scavenger line 31 is connected to outlet nipple 301 of carburetor C and extends to scavenger inlet nipple 29 of pump P. With engine 3 in operation, cam 57 is driven to actuate the rod 73 of pump P. When rod 73 moves upward, it acts through casing 161 to pull up the slack portion of pump diaphragm 67 and to load the spring 75. This expands both the primary and scavenger pump chambers 159 and 171, thereby priming the primary chamber 159 and drawing overflow fuel from overflow chamber O of carburetor C into scavenger chamber 171. When rod 73 is then driven downward by the spring 75, it acts through casing 161 to contract both the primary and scavenger chambers 159 and 171. Fuel is thereupon delivered through line 25 to the fuel bowl B of carburetor C, in amount depending on the position of fuel inlet metering pin 295 of the carburetor.

The position of the metering pin depends on the position of the throttle valves 223 of the carburetor, hence reflects the engine fuel demand. On high demand, pin 295 is down for relatively high delivery of fuel. On low demand, pin 295 is up for relatively low delivery of fuel. Thus, pump P is adapted, by means of the single diaphragm 67, to pump fuel to carburetor C at a rate in excess of engine fuel demand so as to maintain fuel in the carburetor bowl chambers 275 at the level of the tops of the weirs 267, and also to scavenge overflow fuel which has flowed over the weirs into overflow chamber O.

It will be observed that pump diaphragm 67 is spring-loaded (by spring 75) for downward flexure through a primary and scavenger discharge stroke and is flexed upward through a primary and scavenger intake stroke by rod 73, and that there is no packing in the pump subject to attack by fuel. This packless construction is made possible by reason of the rise of the diaphragm 67 with the center hole 149, clamped around the hole 149 to the body 69.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A dual pump for use in a fuel system for an internal combustion engine having an overflow type of carburetor, said pump being adapted to pump fuel from a fuel tank to the carburetor and to scavenge overflow fuel from the carburetor and pump it back to the tank, said pump comprising a rocker arm housing, a rocker arm pivoted in said housing, a pump head on said housing, a cup-shaped pump body secured to said head, said body having a central hub with an axial opening, a diaphragm having a central hole registering with the opening in the hub, the diaphragm having its inner margin around its center hole sealed to the hub around the opening in the hub and having its outer margin clamped between the body and the head with an intermediate annular portion of the diaphragm between the hub and the clamped margin of the diaphragm constituting an annular slack loop free for flexure, thereby providing a primary pump chamber on the side of the diaphragm toward the body, said body having a valved inlet and a valved outlet for said primary chamber, a cup-shaped casing having a rim portion secured in sealed relation to the loop on the other side of the diaphragm and providing a scavenger pump chamber between the casing and the diaphragm, said body having a valved inlet and a valved outlet in communication with said scavenger chamber via said opening in the hub, a rod secured to said casing and extending into said rocker arm housing, said rocker arm being adapted to move said rod in the direction away from said body, and a compression spring in said head surrounding said rod biasing said casing in the opposite direction.

2. A pump comprising a pump body having an opening, an annular diaphragm having a center hole therein registering with said opening, said diaphragm having the inner margin around said center hole sealed to said body around said opening and the outer margin of said diaphragm sealed to said body with an annular portion intermediate said diaphragm margins free for flexure to provide an annular first pump chamber on one side of said diaphragm portion between said annular diaphragm portion and said body, a casing sealed to the other side of said diaphragm portion to provide a second pump chamber between said casing and said diaphragm, and means for actuating the casing to actuate said diaphragm portion to expand and contract said pump chambers, said body including a valved inlet passage and a valved outlet passage to said first chamber and a valved inlet and a valved outlet passage to said second chamber, said opening constituting a portion of said inlet and outlet passages to said second chamber.

3. The pump set forth in claim 2 including a tubular clamp element extending through said center hole in said diaphragm and secured in said opening in said body, said clamp element having a flange at one end thereof engaging said diaphragm around said center hole and forcing said inner diaphragm margin onto said body to form a seal thereto.

4. A pump as set forth in claim 2 wherein said pump body includes a housing enclosing said casing and diaphragm, said casing actuating means including a compression spring mounted between said housing and said casing for driving said casing and said intermediate annular portion of said diaphragm in one direction, and a rod connected to said casing to move said casing and said intermediate annular diaphragm portion in the opposite direction.

5. A pump comprising a pump body having a pair of surfaces disposed on opposite sides of said body, a central passage extending from one of said surfaces to the other of said surfaces, an annular diaphragm having a center hole therein registering with one end of said central passage at said one surface, said diaphragm having the inner margin thereof around said center hole sealed to said body around said one passage end and the outer margin of said diaphragm sealed to said one body surface with an annular portion intermediate said diaphragm margins free for flexure to provide an annular first pump chamber between said one side of said annular diaphragm portion and said body, a pair of passages extending from said first pump chamber through said body to said other surface thereof, a casing sealed at its periphery around the other side of said annular diaphragm portion and over said diaphragm hole to provide a second pump chamber between said casing and said diaphragm, and means for actuating the casing to actuate said diaphragm portion to expand and contract said pump chambers, and an inlet valve means within one of said pair of passages and an outlet valve means within the other of said pair of passages, said central body passage including a valved inlet portion and a valved outlet portion.

6. The invention of claim 5 including a sheet metal cup enclosing said pump body, a gasket in the bottom of said cup and pressed by said cup against said other body surface to seal the other end of said central passage and said pair of passages, conduit means extending through said body and cup to said central passage and said pair of passages to connect said passages to points outside said pump.

7. A pump comprising a pump body having an opening, an annular diaphragm having a center hole therein registering with said opening, said diaphragm having the inner margin thereof around said center hole sealed to said body around said opening and the outer margin of one surface of said diaphragm fixed to said body with an annular portion intermediate said diaphragm margins free for flexure, a casing sealed at its periphery to said diaphragm portion at the other surface of said diaphragm to provide a pump chamber between said casing and said diaphragm, and means for actuating the casing to actuate said diaphragm portion to expand and contract said pump chamber, said body including a valved inlet passage and a valved outlet passage to said pump chamber, said opening constituting a common portion of said inlet and outlet passages to said pump chamber.

8. A pump comprising a pump body having a passage therethrough, an annular diaphragm having a center hole therein registering with one end of said passage, said diaphragm having the inner margin thereof around said center hole sealed to said body around said one passage end and the outer margin of one surface of said diaphragm fixed to said body with an annular portion intermediate said diaphragm margins free for flexure, a casing enclosing said passage end and sealed at its periphery to said diaphragm portion at the other surface of said diaphragm to provide a pump chamber between said casing and said diaphragm, and means for actuating the casing to actuate said diaphragm portion to expand and contract said pump chamber, said body passage including a valved inlet portion and a valved outlet portion.

9. The invention of claim 8 including a sheet metal cup enclosing said pump body, a gasket in the bottom of said cup and pressed by said cup against said body to seal the other end of said body passage, an inlet nipple extending through said body and cup to said inlet passage portion, and an outlet nipple extending through said body and cup to said outlet passage portion.

10. A pump comprising a body having a cup-shaped portion and a central hub extending from the bottom of said cup-shaped portion, said hub having an axial opening, a diaphragm having a center hole registering with said opening in said hub, said diaphragm having its inner margin around its center hole sealed to said hub around the opening in the hub and having its outer margin fixed to the wall of said cup-shaped body portion with an intermediate annular portion of said diaphragm between said hub and wall constituting an annular slack loop free for flexure, a cup-shaped casing extending over said hub and having a rim portion sealed around said annular loop on the other side of said diaphragm to form a pumping chamber between said diaphragm and said casing, means for actuating the casing to actuate the diaphragm to expand and contract said pump chamber, said body having a valved inlet passage and a valved outlet passage, said hub opening connecting said passages to said pump chamber.

11. A pump comprising a cup-shaped body having a central hub, said hub having an axial opening, a diaphragm having a center hole registering with the opening in the hub, the diaphragm having its inner margin around its center hole sealed to the hub around the opening in the hub and having its outer margin sealed to the wall of the cup-shaped body with an intermediate annular portion of the diaphragm between said hub and wall constituting an annular slack loop free for flexure, thereby providing an annular pump chamber on the side of the diaphragm toward the body adapted to be expanded and contracted by said loop, said body having a valved inlet and a valved outlet for said chamber, a cup-shaped casing having a rim portion secured in sealed relation to the loop on the other side of the diaphragm, forming a space between the casing and the diaphragm, said space constituting a second pump chamber, said body having a valved inlet conduit and a valved outlet conduit, said opening in said hub forming a passage connecting said second chamber to said inlet and to said outlet conduits respectively, and means for actuating the said casing to actuate the diaphragm.

12. A pump as set forth in claim 3 wherein said tubular clamp element includes means at its other end securing it in the opening in said body.

13. A pump as set forth in claim 3 wherein said tubular clamp element has a press fit in said opening.

14. A pump as set forth in claim 2 wherein said casing is cup-shaped with a rim portion secured in sealed relation to said intermediate annular portion of said diaphragm.

References Cited by the Examiner

UNITED STATES PATENTS

| | | | |
|---|---|---|---|
| 2,692,766 | 10/1954 | Carlson et al. | 261—72 |
| 2,832,295 | 4/1958 | Waldherr | 103—150 |
| 2,868,135 | 1/1959 | Reinertson | 103—150 |
| 2,877,715 | 3/1959 | Rittenhouse | 103—150 |
| 2,921,775 | 1/1960 | Moseley | 261—72 |

FOREIGN PATENTS

| | | |
|---|---|---|
| 720,745 | 12/1931 | France. |
| 44,169 | 8/1934 | France. |
| | | (1st addition to No. 752,940) |
| 348,108 | 1/1922 | Germany. |
| 137,679 | 1/1920 | Great Britain. |
| 734,294 | 7/1955 | Great Britain. |

DONLEY J. STOCKING, *Primary Examiner.*

KARL J. ALBRECHT, WARREN E. COLEMAN, JOSEPH H. BRANSON, JR., LAURENCE V. EFNER, *Examiners.*